United States Patent [19]

Matsuoka et al.

[11] Patent Number: 4,487,897

[45] Date of Patent: Dec. 11, 1984

[54] PROCESS FOR RADICAL POLYMERIZING ACRYLIC MONOMERS

[75] Inventors: Naoki Matsuoka; Hiroshi Matsumoto; Yutaka Hori; Yoshio Miki; Kenji Sano; Ichiro Ijichi, all of Osaka, Japan

[73] Assignee: Nitto Electric Industrial Co., Ltd., Osaka, Japan

[21] Appl. No.: 467,634

[22] Filed: Feb. 18, 1983

[51] Int. Cl.³ .............................................. C08F 2/02
[52] U.S. Cl. ..................................... 526/64; 526/62; 526/88
[58] Field of Search ............................. 526/62, 64, 88

[56] References Cited

U.S. PATENT DOCUMENTS

| | | | |
|---|---|---|---|
| 3,234,303 | 2/1966 | Bild | 526/64 |
| 3,983,096 | 9/1976 | Segalini | 526/64 |
| 4,196,272 | 4/1980 | Goretta | 526/64 |
| 4,383,093 | 5/1983 | Shiraki | 526/88 |

*Primary Examiner*—Paul R. Michl
*Attorney, Agent, or Firm*—Sughrue, Mion, Zinn, Macpeak and Seas

[57] ABSTRACT

A process for polymerizing acrylic monomers is disclosed. The process involves providing a reactor which is generally in the shape of a screw type reactor having temperature control means thereon. The reactor is continually charged with a supply of acrylic monomers having a viscosity of 10 poises or less at ordinary temperature. The acrylic monomers are continually moved through the reactor by turning of the screw within the reactor in order to cause the acrylic monomers to continually contact renewed surfaces within the reactor. The temperature in the reactor is controlled within two or more zones within the reactor in order to increase the viscosity of the acrylic monomers in the reactor by rapid polymerization within an initial area and then allow polymerization to proceed to one or more additional areas in the reactor to a prescribed rate of conversion. Polymerized product is continuously removed from the reactor.

11 Claims, 1 Drawing Figure

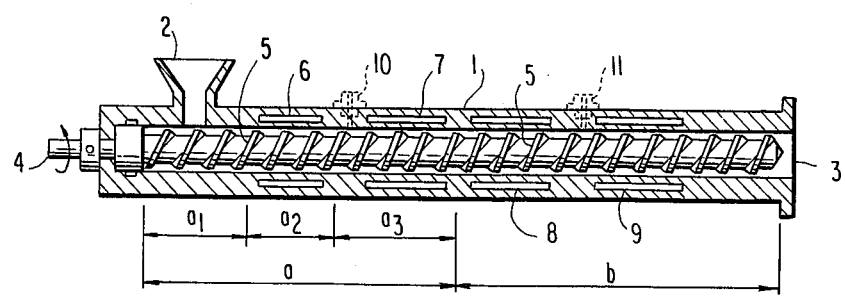

PROCESS FOR RADICAL POLYMERIZING ACRYLIC MONOMERS

FIELD OF THE INVENTION

The present invention relates to a process for radical polymerizing acrylic monomers.

BACKGROUND OF THE INVENTION

Radical polymerization processes of ethylenically unsaturated monomers are known which employ emulsions or suspension polymerization processes, solution polymerization processes and bulk polymerization processes. Emulsion or suspension polymerization processes suffer from the disadvantage that pure polymers are scarcely obtained due to contamination of emulsifying or dispersing agents. In addition, when polymerized products are recovered from the emulsion or suspension, the processes are disadvantageous in that considerable cost is required for evaporating water therefrom due to the consumption of time and energy. The solution polymerization processes are beset with problems on environmental hygiene and costs due to the use of large quantities of organic solvents. With regard to the recovery of polymerized products, the solution polymerization processes also suffer from the same problems as in the case of emulsion or suspension polymerization processes.

Bulk polymerization processes are free from such problems and, hence, commercially advantageous. The details of the bulk polymerization are described in, for example, U.S. Pat. Nos. 2,530,409, 2,745,824 and 2,931,793. However, bulk polymerization reactions of certain monomers have a tendency to proceed out of control due to difficulty in controlling their reaction temperature resulting from increase in viscosity owing to rapid progress of polymerization reactions thereof. As a result, bulk polymerization operations of such monomers entail dangers. In addition, the control of molecular weight distribution becomes difficult and the formation of by-products, such as gels and deteriorated products can result. Accordingly, homogeneous products could hardly be obtained, and processings of polymers containing such by-products cannot be carried out smoothly in the following steps.

It is known that bulk polymerization of styrene can be controlled until the reaction reaches a relatively high rate of conversion in comparison with other ethylenically unsaturated monomers. Bulk polymerization of styrene, therefore, has long been studied and practiced commercially. In most of the commerical processes, styrene monomers are polymerized up to a conversion rate of 30 to 70% in a preliminary reactor of a vessel type, and the remaining monomers are removed therefrom to give finished products, or the preliminary polymerization products are charged into an extruding machine and subjected to further polymerization reaction up to a conversion rate of 95 to 96% under mild conditions.

Bulk polymerization of acrylic monomers, however, cannot be conducted satisfactorily by the above-described processes used for polymerization of styrene since the temperature of polymerization reaction of acrylic monomers cannot be easily controlled due to heat evolved during the reaction. Accordingly, bulk polymerization of acrylic monomers has not been practiced commercially.

SUMMARY OF THE INVENTION

Accordingly, an object of the present invention is to provide a commercially available process for radical polymerizing acrylic monomers in bulk.

Another object of the present invention is to provide a process for continuously radical polymerizing acrylic monomers in bulk in which the rapid increase in viscosity due to the heat evolved during the polymerization reaction can be utilized.

In accordance with the present invention, there is provided a process for radical polymerizing acrylic monomers in bulk, wherein a raw material for bulk polymerization comprising acrylic monomers and having a viscosity of 10 poises or less at ordinary temperature (e.g., about 20 to 30° C.) is continuously introduced into a reactor and then continuously conveyed through its conveyance course provided with temperature controlling means, thereby causing the mixture to contact with renewed surfaces of said reactor and controlling its temperature in such a manner that the viscosity of the material can be increased through rapid polymerization of the acrylic monomers in the first half of said course and the polymerization can proceed up to a prescribed rate of conversion in the second half thereof, followed by continuous recovery of bulk polymers out of the reactor.

BRIEF DESCRIPTION OF THE DRAWING

The FIGURE is a sectional view illustrating an example of a single screw extruder used as a reactor to carry out the process of the invention.

DETAILED DESCRIPTION OF THE INVENTION

The radial polymerization process according to the invention will hereinafter be described with reference to the FIGURE.

In the FIGURE, an extruder comprises a barrel 1, at the end of which is provided a feed hopper 2 for receiving a mixture of raw materials. At the other end of the barrel is provided an opening 3 for recovering polymerized products. A plurality of screws 5 are formed on a shaft 4 which rotates in barrel 1. Screws 5 mix the mixture of raw materials introduced from hopper 2 and convey it forwardly. A gap may exist between screws 5 and barrel 1 in order to ensure good mixing of the mixture. In general, a gap of 0.5 to 2 mm is appropriate. Along the longitudinal direction of barrel 1 are provided heat controlling means 6, 7, 8 and 9 which maintain respective parts of the extruder at appropriate temperatures. Barrel 1 may be uniformly heated over its longitudinal direction, as is done with examples described hereinafter.

Into the extruder, a raw material for bulk polymerization comprising acrylic monomers and having a viscosity of 10 poises or less at ordinary temperature (e.g., about 20° to 30° C.) is continuously supplied at a desired rate through feed hopper 2, preferably after being subjected to nitrogen replacement. The raw material is admixed and conveyed forwardly by the rotation of screws 5, whereby the raw material is caused to contact with renewed surfaces of the extruder or reactor. For the purpose of increasing the viscosity of the raw material within the first half of its conveyance course, which is designated as a in the FIGURE (i.e., the area from feed hopper 2 to opening 3) through rapid polymerization thereof, the heat controlling means 6 and 7 controls the temperature of barrel 1 in such a way that the raw material can be heated gradually in zones $a_1$ and $a_2$ and strongly in zone $a_3$, so that the polymerization reaction of the raw material can start immediately in zone $a_3$ and can proceed very rapidly in the same zone. Though varying depending upon the decomposition temperature of a radical polymerization initiator used, the temperature of zones $a_1$ and $a_2$ is preferably 40° to 120° C. and the temperature of zone $a_3$ is preferably 60° to 150° C., and the temperature of zones $a_1$ and $a_2$ is equal to or lower than the temperature of zone $a_3$.

The polymerized material having an increased viscosity is then conveyed to the second half of its conveyance course (or zone b of barrel 1), in which the material is further mixed with surface renewal and with temperature control (preferably 100° to 180° C.) effected by heat controlling means 8 and 9, so that its polymerization reaction can proceed up to a desired rate of conversion (about 93 to 99 wt%). Polymerized products are recovered from opening 3.

Although, in the case shown in the FIGURE, shaft 4 has a uniform diameter in all the parts thereof, it is also possible to change its diameter from part to part in order to control the reaction by changing the amount of the raw material or polymerized material conveyed.

In this example, a single screw extruder is used as a reactor. However, a twin screw extruder may also be used for the polymerization process of the invention. When a twin extruder is used, the shafts may be rotated either in the same direction or in different directions. In this case, too, the gap between a barrel and screws is preferably from about 0.5 to 2 mm. Further, the gap between two screws is also preferably about 0.5 to 2 mm. In general, the velocity gradient of extruders used in the process according to the invention (namely: (ratio of circumference to diameter $(\pi)$)×(number of rotation)×(outer diameter of screw)/(gap between barrel and screw)) is preferably not less than 1,000/min, preferably 3,000 to 50,000/min. In conducting the process according to the invention, there may be used, in addition to extruders of the type described above, any reactor, provided it is capable of continuously conveying its contents with surface renewal and equipped with temperature controlling means over its full length. The term "surface renewal" means renewal of reactor's surfaces contacted with its contents. The surface renewal renders it possible to depress undesirable side reactions through effective exchange of heat between the reactor's surfaces and its contents.

In the above-described process according to the invention, the increase in viscosity (at least 100 poises) of the polymerized material in the first half of its conveyance within the barrel is a key factor for ensuring stable conveyance of the material and, at the same time, controlling the temperature thereof. In a reactor to be used in the invention, e.g., a screw extruder described above, its contents can be easily conveyed in a stable fashion when there is no change in its viscosity along the longitudinal direction of the barrel. However, if there is a large viscosity gradient in the longitudinal direction of the barrel and the viscosity of its content is relatively low over a long distance of the barrel, its content cannot be conveyed in a stable manner since its screws rotate idle and, hence, dead or reverse flows of the contents may occur. Accordingly, the contents must have a small viscosity gradient over as long a distance as possible of its conveyance course.

As is already described, polymerization reactions of acrylic monomers have a tendency to proceed rapidly, thereby causing an increase in viscosity. This increase in viscosity was an obstacle for bulk polymerization of acrylic monomers. On the contrary, this tendency of acrylic monomers is utilized in the present invention. That is to say, in the process according to the invention, the viscosity of the raw material can be increased to a degree required for a stable conveyance thereof within a few minutes through rapid polymerization in the first half of its conveyance course, even if a raw material comprising acrylic monomers and having a viscosity of 10 poises or less is used for the bulk polymerization. In addition, in the process according to the invention, the temperature of the material can be controlled in accordance with temperatures of finely divided areas in the course of its conveyance since its conveyance is effected with "surface renewal". Accordingly, the polymerization reaction can be well controlled, so that it would not proceed out of control.

In general, the viscosity required for a stable conveyance of the material is in the range of 100 to several 1,000 poises, although it varies depending on the type and size of reactors, the kind of acrylic monomers, desired properties of polymerized products, and the like. It is a matter of course that the rapid polymerization may be carried out in zone $a_2$ instead of zone $a_3$ of the barrel shown in the FIGURE.

In prior solution polymerization processes of acrylic monomers, which are controlled through dilution with organic solvents, a long period of time as much as 1 to 10 hours is required for attaining a rate of conversion corresponding to the above-described range of viscosity.

The raw material used in the process according to the invention may be a liquid having a viscosity of 10 poises or less at ordinary temperature (20°–30° C.) and comprising acrylic monomers, such as alkyl esters of acrylic and methacrylic acids and derivatives thereof. The raw material may be incorporated with radical polymerization initiators, molecular weight regulators, etc., as well as additional ethylenically unsaturated monomers capable of being copolymerized with the acrylic monomers. Examples of such ethylenically unsaturated monomers include acrylic acid, methacrylic acid, maleic acid, styrene, vinyl acetate, acrylonitrile, and the like. The ethylenically unsaturated monomers can be present in an amount up to about 50 wt%.

Examples of radical polymerization initiators used in the process according to the invention include organic peroxides, such as benzoyl peroxide, cumene hydroperoxide, di-t-butyl peroxide and lauroyl peroxide; azo compounds, such as azobisisobutyronitrile; and the like. The amount of initiator used is preferably from about 0.01 to 1 part by weight, per 100 parts by weight of the monomers. It is also possible to use redox initiators capable of generating radicals at low temperatures. Where the redox initiator is used, a reducing agent such as dimethylaniline or triethylamine is co-used. Examples of molecular weight regulators used in the process of the invention include chain transfer agents, such as thioglycol, thioglycolic acid, lauryl mercaptan and decyl mercaptan.

In order to impart desired properties to bulk polymerization products according to the invention, the raw materials may be additionally incorporated with small amounts of solvents, plasticizers, polymers, and the like. The total amount of such additives is preferably less than 25 parts by weight, per 100 parts by weight of the monomers.

The radical polymerization initiators and molecular weight regulators may be added to the mixture of raw materials in advance to its reaction. It is also possible to incorporate such additives into the mixture after it is charged into a reactor. For example, when the reactor shown in the FIGURE is used, they can be introduced thereinto through an outlet 10 provided in zone $a_3$. In the FIGURE, numeral 11 is an outlet for releasing gas generated by the polymerization reaction or by the incorporation of optional additives.

In the continuous polymerization process described hereinabove, the temperature of respective parts of the reactor can be controlled in accordance with the kinds of monomers and polymerization initiators used, the amount of its contents conveyed through respective parts, and the like. The temperature of the raw materials (or contents of reactor) is controlled, in general, at 40° to 180° C., preferably 60° to 150° C. In particular, the heating temperature in the zone in which the raw material is rapidly polymerized to increase its viscosity has to be decided in accordance with the kind and amount of polymerization initiators used, the structure of reactor used and the condition of conveyance. Bulk polymerization products obtained in accordance with the process of the invention generally have a conversion rate of 93 to 99%.

As described hereinabove, bulk polymerization of acrylic monomers has now been rendered possible by the process according to the invention. In addition, homogeneous bulk polymerization products having a relatively small molecular weight distribution and containing reduced by-products, such as gels and deteriorated products, can be produced continuously.

Examples of the invention are described hereinbelow. In these examples, parts and percents mean parts by weight and percents by weight, respectively.

EXAMPLE 1

A continuous bulk polymerization was carried out using a mixture of 50 parts of methyl methacrylate, 50 parts of ethyl acrylate and 0.15 part of azobisisobutyronitrile and having a viscosity of 0.6 centipoise at 25° C. In this polymerization reaction was used a mono-shaft screw extruder as shown in the FIGURE which had an outer diameter of screw of 50 mm, a barrel length of 1,000 mm, a gap between the barrel and the screw edge of 1 mm, and a velocity gradient of 7.850/min. The mixture was introduced into the extruder at a rate of 50 cc/min. under nitrogen replacement, and the temperature of the barrel was maintained at 100° C. over the full length thereof.

Bulk polymerization products having a conversion rate of 98.9% were obtained. The products had a weight average molecular weight ($\overline{M}w$) of 400,000, a number average molecular weight ($\overline{M}n$) of 55,000 and, hence, an $\overline{M}w/\overline{M}n$ ratio of 7.3. This indicates that the products have a relatively small molecular weight distribution and, hence, are homogeneous.

EXAMPLE 2

A continuous bulk polymerization was carried out in a similar manner as in Example 1, using a mixture of 90 parts of n-butyl acrylate, 10 parts of styrene, 0.7 part of 2-hydroxyethyl acrylate and 0.1 part of benzoyl peroxide and having a viscosity of 0.9 centipoise at 25° C. In this polymerization reaction was used a twin screw extruder (self-cleaning type) having an outer diameter of screws of 40 mm, a length of barrel of 1,000 mm, a gap between the barrel and screw edges of 0.5 mm and a velocity gradient of 5.000/min. The mixture was introduced into the extruder at a rate of 50 cc/min. under nitrogen replacement, and the temperature of the barrel was maintained at 90° C. over the full length thereof.

Bulk polymerization products having a conversion rate of 96.3% were obtained. The products had an $\overline{M}w$ of 530,000, an $\overline{M}n$ of 65,000, and hence an $\overline{M}w/\overline{M}n$ ratio of 8.2. This indicates that the products have a relatively small molecular weight distribution and are homogeneous.

While the invention has been described in detail and with reference to specific embodiments thereof, it will be apparent to one skilled in the art that various changes and modifications can be made therein without departing from the spirit and scope thereof.

What is claimed is:

1. A process for radical polymerizing acrylic monomers, comprising the steps of:
    providing a reactor having a temperature control means thereon;
    continuously charging the reactor with a supply of acrylic monomers having a viscosity of 10 poises or less at ordinary temperatures wherein the acrylic monomers comprise at least 50% by weight of alkyl esters of acrylic acids;
    continuously conveying the supply of acrylic monomer through a conveyance course of the reactor thereby causing the supply to continuously contact renewed surfaces of the reactor wherein the viscosity gradient in the reactor is not less than 100/min;
    controlling the temperature of the supply in the reactor such that the viscosity of the supply in the reactor can be increased by rapid polymerization of the acrylic monomers in the first half of the reactor to at least 100 poises and the polymerization thereof can proceed up to a prescribed rate of conversion in a secondary area of the reactor wherein the temperature in the first half of the reactor is 40° to 120° C. and the temperature in the secondary area of the reactor is 60° to 150° C.; and
    continuously recovering polymerized product from the reactor.

2. A process as claimed in claim 1, wherein the reactor is in the form of a single screw extruder reactor.

3. A process as claimed in claim 1, wherein the reactor is in the form of a twin extruder reactor.

4. A process as claimed in claim 2, wherein the single screw extruder reactor is comprised of a screw contained within a barrel in such a manner that as the screw is turned the acrylic monomer is moved through the reactor on the conveyance course.

5. A process as claimed in claim 2, wherein the distance between the outer portions of the screw and the inner diameter of the barrel is within the range of 0.5 to 2 mm.

6. A process as claimed in claim 1, wherein the reactor is further charged with an initiator in an amount of 0.1 to 1 part by weight per 100 parts by weight of the acrylic monomers.

7. A process as claimed in claim 1, wherein the reactor further includes additives in an amount of 25 parts by weight or less per 100 parts by weight of the acrylic monomers.

8. A process as claimed in claim 1, wherein the prescribed rate of conversion is within the range of 93 to 93%.

9. A process as claimed in claim 3, wherein the distance between the outer portions of the screw and the inner diameter of the barrel is within the range of 0.5 to 2 mm.

10. A process as claimed in claim 6, wherein the initiator is a redox initiator.

11. A process as claimed in claim 1, wherein the velocity gradient of the reactor is 3000 to 50,000/min.

* * * * *